United States Patent
Ishitobi et al.

(10) Patent No.: US 7,196,995 B2
(45) Date of Patent: Mar. 27, 2007

(54) METHOD OF AUTHENTICATING DISK MANAGEMENT INFORMATION AND DISK DEVICE

(75) Inventors: Tatsuya Ishitobi, Kawasaki (JP); Hiroaki Ono, Fujisawa (JP); Jun Ohya, Mito (JP)

(73) Assignee: Hitachi, Ltd., Tokyo (JP)

( * ) Notice: Subject to any disclaimer, the term of this patent is extended or adjusted under 35 U.S.C. 154(b) by 495 days.

(21) Appl. No.: 10/618,271

(22) Filed: Jul. 10, 2003

(65) Prior Publication Data

US 2004/0184377 A1    Sep. 23, 2004

(30) Foreign Application Priority Data

Mar. 20, 2003    (JP)    ............... 2003-076788

(51) Int. Cl.
*G11B 7/00*    (2006.01)
*G11B 19/04*    (2006.01)
*G11B 20/18*    (2006.01)

(52) U.S. Cl. ............... 369/53.21; 369/47.53; 369/53.32; 369/53.37

(58) Field of Classification Search ............ None
See application file for complete search history.

(56) References Cited

U.S. PATENT DOCUMENTS 5,226,027 A * 7/1993 Bakx ............ 369/47.55

6,208,602 B1 * 3/2001 Frank ............ 369/53.22
2003/0117920 A1 * 6/2003 Sako et al. ............ 369/53.21

FOREIGN PATENT DOCUMENTS

JP    2002-312940    10/2002

* cited by examiner

Primary Examiner—William Korzuch
Assistant Examiner—Tawfik Goma
(74) Attorney, Agent, or Firm—Townsend and Townsend and Crew LLP (57) ABSTRACT

Processing to confirm management information during starting processing of a disk device is completely executed in a short period of time without scanning a data area to thereby minimize the period of time for the starting processing. The management information confirming processing can be executed after the disk device notifies the condition to the host or the user. Therefore, the response characteristic of the disk device is improved. Authentication information to certify that management information recorded on a disk is valid and invalidating information to invalidate the authentication information are provided. When the invalidating information to invalidate the authentication information is present, it is possible to determine that the management information is invalid or is possibly invalid. When the invalidating information to invalidate the authentication information is absent, it is possible to determine that the management information is valid according to the authentication information.

6 Claims, 4 Drawing Sheets

METHOD OF AUTHENTICATING DISK MANAGEMENT INFORMATION AND DISK DEVICE

BACKGROUND OF THE INVENTION

1. Field of the Invention

The present invention relates to a method of authenticating validity of management information in a disk device, and in particular, to a method of authenticating validity of management information of a disk in a disk device.

2. Description of the Related Art

In a disk, for example, a DVD-R (digital versatile disks (DVD) recordable) on which a sequence of data items are sequentially written, a management area is disposed to record management information including a recording progress state in a data area on the disk. The disk device conducts starting processing, for example, when the device is turned on or powered or when a disk is loaded in the device. In the starting processing, the disk device reads latest management information from the management area on the disk. Since the management information thus obtained indicates recording progress in the data area, the disk device can identify a start position to additionally write data in the data area. However, since information of the recording progress does not match with the recording state of the data area in some cases, it is required in the prior art to scan the data area to confirm validity of the recording progress information obtained from the management information. Description will be given of a specific example of this operation by referring to FIGS. 4 to 7 including a process to record data on a DVD-R in an unrecorded state.

Figure 4:
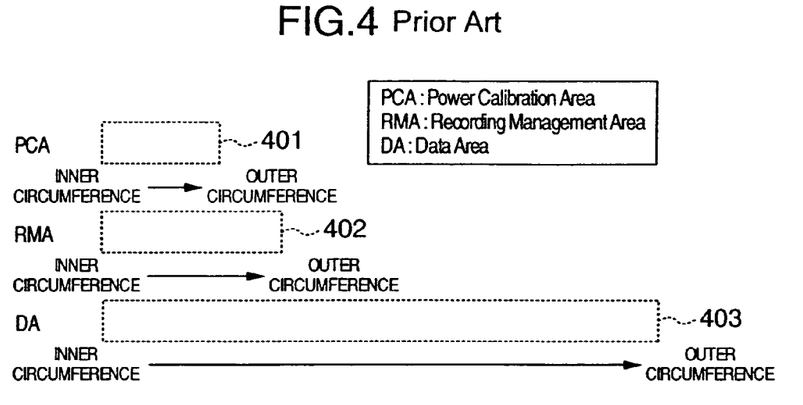
FIG. 4 is a schematic diagram showing a state of a DVD-R in an unrecorded state.

FIG. 4 conceptually shows three areas on a DVD-R. These areas are in an unrecorded state. In FIG. 4, numeral 401 indicates a power calibration area (PCA) for a disk device to determine appropriate recording power. Numeral 402 denotes a recording management area (RMA) to record recording management data (RMD) as management information. Numeral 403 denotes a data area to record data. In each area, a left-hand side corresponds to an inner circumferential side of the disk and a right-hand side corresponds to an outer circumferential side of the disk. In an actual DVD-R, the power calibration area exists at an inner-most position, the recording management area exists at an intermediate position, and the data area exists at an outer-most position. The respective areas are different in size from each other to represent recording capacity of each area. The data area 403 occupies most of the disk areas.

After the DVD-R in the unrecorded state shown in FIG. 4 is loaded in a disk device, when a host unit or a host specifies a recording mode for the disk device, the disk changes its state to a state shown in FIG. 5 according to a procedure as below.

When the host specifies the recording mode, the disk device conducts trial writing or power calibration in a power calibration area 401 to obtain appropriate writing power. Numeral 501 in the power calibration area 401 of FIG. 5 indicates a test pattern recorded by the trial writing or power calibration. According to specifications, data is written in each area on the disk in a direction from an inner-most circumference to an outer-most circumference. However, it is particularly specified that data is written in the power calibration area on the disk in a direction from an outer-most circumference to an inner-most circumference. Therefore, the test pattern 501 is recorded on an outer-most side of the power calibration area 401.

After the power calibration, the disk device records recording management data 502 in the recording management area 402, the data 502 including the recording mode of the disk specified by the host. Although not shown in FIG. 5, it is assumed that an incremental recording mode is specified as the recording mode. After the disk is set to the state shown in FIG. 5, it is first possible to record data in the data area of the disk.

Figure 5:
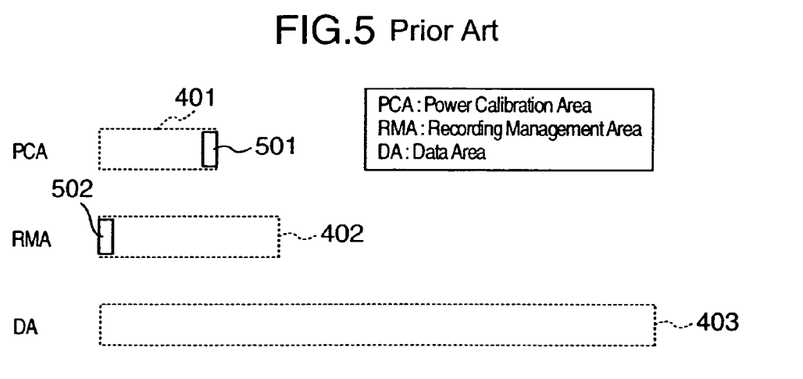
FIG. 5 is a schematic diagram showing a state of the disk of FIG. 4 after a recording mode is determined.
Figure 6:
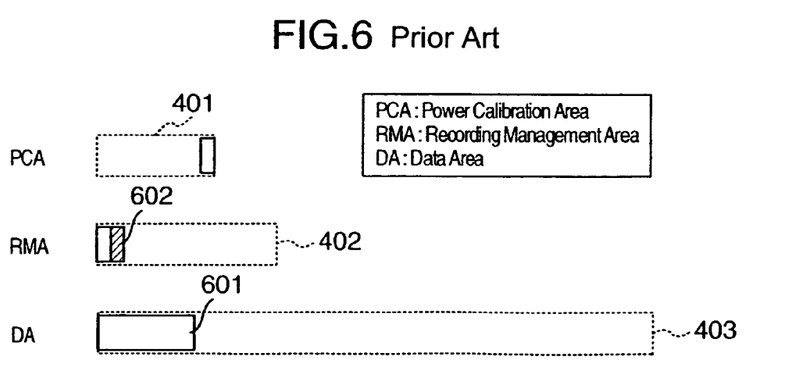
FIG. 6 is a schematic diagram showing a state of the disk of FIG. 5 in which data is recorded on the disk and management information is additionally recorded thereon.

FIG. 6 shows a state of the disk after data is recorded on the disk in the state of FIG. 5 in response to a data recording indication sent from the host to the disk device. Numeral 601 of FIG. 6 denotes data recorded on the disk. Numeral 602 denotes recording management data written, after the data 601 is completely recorded on the disk, by the disk device to control progress of the recording in the data area. The recording management data is not recorded each time data is recorded on the disk. Ordinarily, when the total amount of data recorded on the disk exceeds a predetermined value, the disk device records the recording management data. FIG. 6 shows a case in which the amount of data 601 exceeds a reference value specified as a criterion to record the recording management data.

Figure 7:
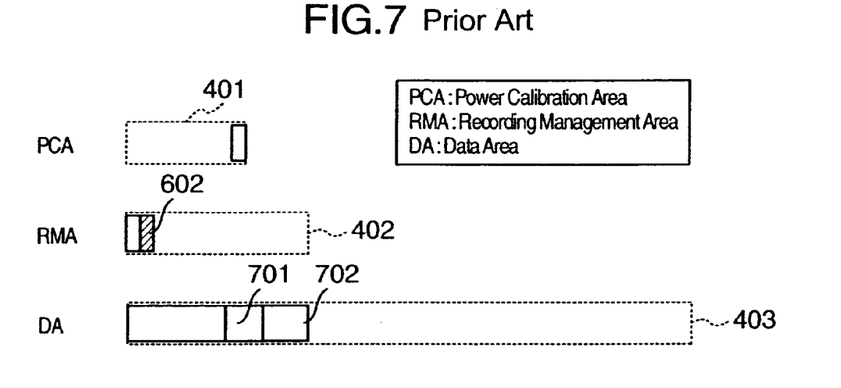
FIG. 7 is a schematic diagram showing a state of the disk of FIG. 6 in which data is additionally recorded on the disk.

FIG. 7 shows a state of the disk after two data items are recorded on the disk in the state of FIG. 6 in response to an indication of sequential recording of two data items sent from the host to the disk device. FIG. 7 shows an operation in which the host issues a request of sequential recording of a data item 701 and a data item 702 to the disk device and then the disk device sequentially records the data items 701 and 702 on the disk. In FIG. 7, the total data amount of the data items 701 and 702 is less than a reference value to additionally write another recording management data. Therefore, the disk device does not record any recording management data. In short, the latest recording management data 602 remains valid as in the state of FIG. 6. Therefore, the state of FIG. 7 indicates a case in which recording progress information in the data area obtained from the latest recording management data does not match with the actual recording state of the recording area.

Next, description will be given of processing executed by the disk device in the prior art when the disk in the state of FIG. 7 is once unloaded from the disk device and is again loaded in the disk device in the state of FIG. 7.

When the disk is loaded in the disk device, the disk device scans the recording management area 402 beginning at the inner-most position to detect a boundary between a recorded area and an unrecorded area. The disk device recognizes recording management data 602 adjacent to the detected boundary as the latest recording management data. Although the disk device recognizes that the recording management data 602 is the latest recording management data in the recording management area 402, it is impossible for the disk device to determine whether or not recording progress information obtained from the recording management data 602 matches with the actual recording state in the data area. In the example shown in FIG. 7, the recording progress information does not match with the actual recording state. However, the disk device cannot recognize the condition, i.e., the mismatching at all. In this situation, the disk device scans the data area according to the recording progress information obtained from the recording management data 602 to detect a position which is a last position of the data 702 and at which the area is changed from the recorded state to the unrecorded state. The disk device therefore determines that a position next to the last position of the data 702 is a position at which data is additionally recorded.

Next, description will be given of processing of the disk device when the disk in the state of FIG. 6 is unloaded from the disk device and is again loaded therein in the state of FIG. 6. When the disk is loaded in the disk device, the disk device scans the recording management area 402 beginning at the inner-most position to detect a boundary between a recorded area and an unrecorded area. The disk device recognizes recording management data 602 adjacent to the detected boundary as the latest recording management data. Although the disk device recognizes that the recording management data 602 is the latest one in the recording management area 402, the disk device cannot determine whether or not recording progress information obtained from the recording management data 602 matches with the actual recording state in the data area. In the example shown in FIG. 6, the recording progress information matches with the actual recording state. Therefore, inherently, it is not required to scan the data area. However, the disk device cannot recognize the condition, i.e., the matching at all. In this situation, as in the case of FIG. 7 described above, the disk device scans the data area according to the recording progress information obtained from the recording management data 602 to detect a position which is a last position of the data 601 and at which the area is changed from the recorded state to the unrecorded state. The disk device therefore determines that a position next to the last position of the data 601 is a position at which data is additionally recorded.

In the prior art, to cope with the problem of this kind, there has been proposed a method in which the upper system of the disk device includes a nonvolatile memory to keep therein a copy of management information to be recorded on the disk. Reference is made to, for example, JP-A-2002-312940, paragraphs [0057]–[0058] with reference to FIG. 5.

According to the method of the prior art, before the upper system instructs the disk device to record data on the disk, the upper system requests the disk device to report the latest management information on the disk. When the management information reported from the disk device does not match that in the nonvolatile memory, the upper system indicates the disk device to record the management information of the nonvolatile memory on the disk. Since the nonvolatile memory always keeps the latest management information, it is not required that the disk device scans the data area before the recording operation to confirm validity of the management information.

The method of the prior art is available only when the nonvolatile memory of the upper system stores management information associated with the disk on which data is to be written. If the nonvolatile memory of the upper system does not store the management information, the disk device must scan the data area regardless of validity or invalidity of the management information. The method is complicated because the upper system of the disk device manages the information, which is inherently to be managed by the disk device. When it is required to keep management information for a plurality of disks, the nonvolatile memory must include storage areas for the disks. This increases the cost necessary for the nonvolatile memory. It is required to establish a correspondence between the disks and associated management information items in the nonvolatile memory. Therefore, the procedure between the upper system and the disk device is complex.

In the prior art, the method to confirm validity of the management information of a disk is not sufficiently effective as described above. Therefore, the disk device must scan the data area on the disk. To avoid the scanning of the data area, there has also been proposed a method to manage the management information by the upper system. However, the method is not sufficiently effective because the disk device cannot manage the management information by itself.

SUMMARY OF THE INVENTION

In the prior art, it is not possible to confirm whether or not the recording progress information obtained from the recording management data as management information matches with the actual recording state of the data area. Therefore, it is required to scan the data area regardless of the matching or mismatching between the recording progress information and the actual recording state. Consequently, the disk device requires a considerable period of time to completely execute the starting processing. This leads to a problem that the disk device cannot directly enter the recordable state immediately after loading of a disk therein or immediately after the disk device is powered.

The problem is particularly critical in a system requiring that the disk device enters the recordable state in a short period of time after loading of a disk therein or after the disk device is powered. Such a system is, for example, a video camera including a disk device. In the video camera, when a user thereof desires to shoot a scene and powers the camera, it is required that the video camera is immediately ready for the shooting operation. In the video camera, if the disk device requires a long period of time to determine a position on a disk to start recording data thereon, the video camera cannot immediately enter the shooting state and hence the user misses the desired scene. As a result of the scanning of the data area, when the management information does not match with the recording state of the data area, it is required, for example, to notify the user that processing is required to establish a matching state therebetween. However, if the condition is notified to the user when a short period of time lapses after the video camera is powered, the user feels unfamiliar feeling with such a response characteristic of the video camera.

It is therefore an object of the present invention to provide a method of authenticating disk management information and a disk device implementing the method in which in starting processing of a disk device, for example, when the device is powered or when a disk is loaded in the device, whether or not latest recording progress information recorded in a management area on the disk matches with a recording state of a data area and is hence valid can be determined in a short period of time, and the response characteristic of the disk device is improved, namely, the response time of the disk device is minimized as a result.

To achieve the object of the present invention, there are proposed aspects of the invention as below. Two information items are additionally recorded on the disk.

The first information item is authentication information to authenticate that the recording progress information recorded in the management area matches with the latest recording state of the data area. For example, when the disk device is turned off or the disk is unloaded from the disk device, the authentication information is recorded on the disk on which the management information is recorded.

The second information item is invalidating information to invalidate the authentication information. When the disk device starts its operation, for example, after the device is powered or a disk is loaded in the disk device, the invalidating information is recorded, through first recording processing of the disk device, on the disk on which the authentication information is recorded.

During the starting processing of the disk device when the device is powered or when a disk is loaded in the device, by confirming validity of the authentication information on the disk provided by the present invention, it is possible to confirm validity of the management information on the disk in a short period of time.

According to the present invention, the disk device can confirm, during the starting processing of the disk device when the device is powered or when a disk is loaded in the device, whether or not the recording progress information obtained from the management information on the disk matches with the actual recording state of the data area without scanning the data area. As a result, when it is determined that the management information is valid, the scanning of the data area is not required. Therefore, the starting processing can be completely executed in a short period of time and hence the response characteristic of the disk device can be resultantly improved. When it is determined that the management information is invalid, the scanning of the data area is conducted. However, before the data area scanning is performed, it is possible to notify the host or the user that the time-consuming data area scanning is required. Therefore, the response characteristic of the disk device can be improved.

According to the technique provided by the present invention, during the starting processing of the disk device when the disk is powered or when a disk is loaded in the device, it is possible to confirm validity of the management information recorded on the disk in a short period of time. As a result, the disk device can determine at an earlier point of time whether or not the disk device can be set to a recordable state. The technique provided by the present invention is usable when a disk device is adopted as a recording device in a system such as a video camera in which it is required that the video camera is ready for the shooting operation immediately after the user turns the camera on or the user inserts a recording medium in the camera.

Other objects, features and advantages of the invention will become apparent from the following description of the embodiments of the invention taken in conjunction with the accompanying drawings.

DESCRIPTION OF THE EMBODIMENTS

Figure 1:
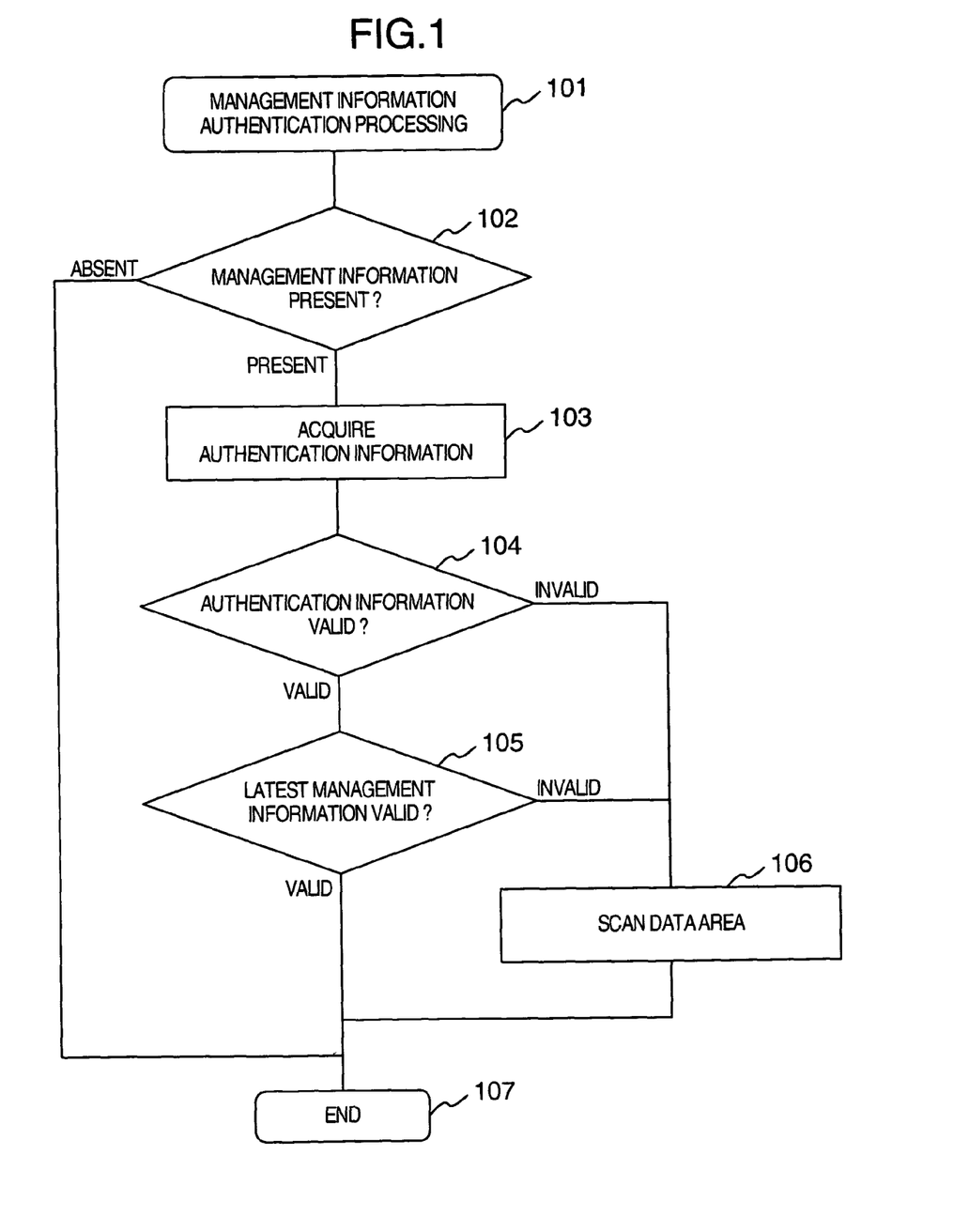
FIG. 1 is a flowchart showing a procedure of management information authentication processing in an embodiment of the present invention.
Figure 2:
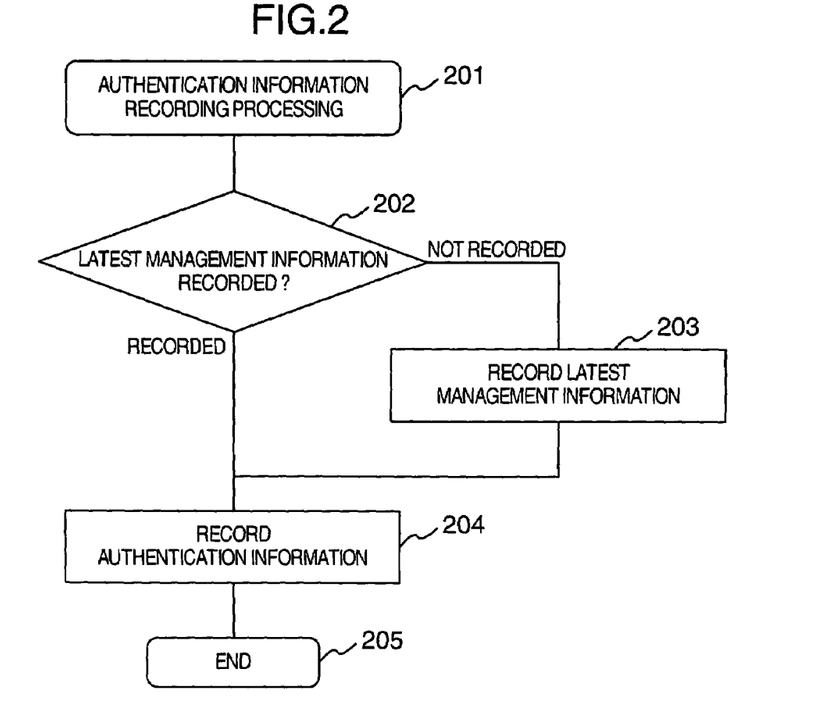
FIG. 2 is a flowchart showing a procedure of authentication information recording processing in an embodiment of the present invention.
Figure 3:
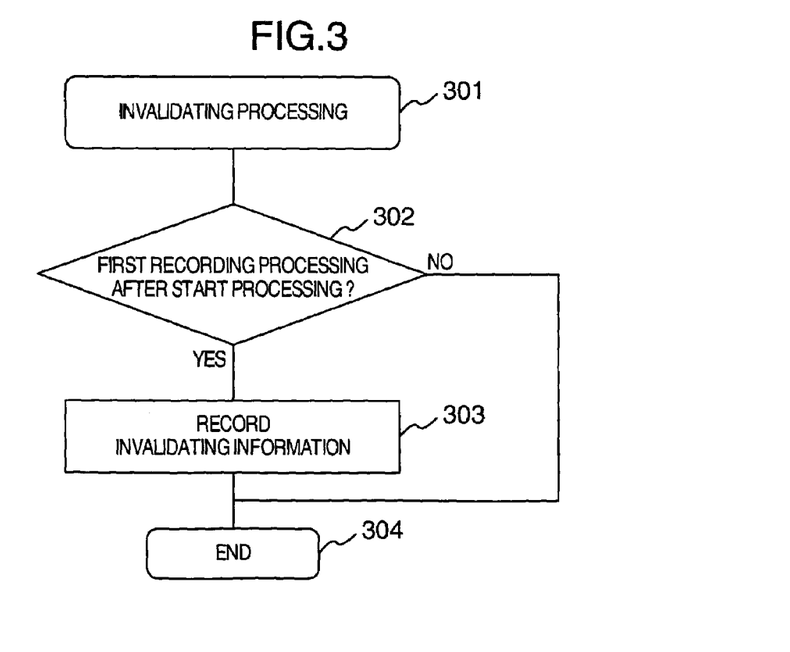
FIG. 3 is a flowchart showing a procedure of authentication information invalidating processing in an embodiment of the present invention.

Referring to FIGS. 1 to 3, description will be first given of an embodiment of the present invention.

FIG. 1 shows an embodiment of the present invention including a procedure of management information authentication (101) to confirm validity of management information recorded on a disk. The procedure of FIG. 1 is conducted in starting processing of a disk device, for example, when the device is powered or when a disk is loaded therein. This leads to an advantage.

The advantage is as follows. Validity of the management information can be confirmed without conducting the processing required in the prior art, specifically, without scanning the data area on the disk. The validity of the management information indicates whether or not recording progress information, which is obtained from the management information and which indicates a range of a recorded area in each data area on the disk, is valid. That is, the validity indicates whether or not the recording progress information matches with an actual recording state of the data area. In the prior art, to confirm the validity of the management information, the disk device scans the data area according to the recording progress information in the management information to confirm whether or not the recording progress information matches with the recording state of the data area. The processing is ordinarily executed during the starting processing when the device is powered or when a disk is loaded therein. However, the processing requires a long period of time and hence elongates the period of time necessary for the starting processing. This deteriorates the response characteristic of the disk device. The present invention solves the problem of the prior art using authentication information as a key to solving the problem. The authentication information is used to authenticate validity of the management information. The present invention provides the authentication information.

When presence of the management information is confirmed in step 102 as shown in FIG. 1, the authentication information is obtained from the disk in step 103. If it is determined in step 104 that the obtained authentication information is valid, validity of the management information is confirmed using the authentication information in step 105. Without scanning the data area, the validity of the management information is confirmed using the authentication information. Therefore, if it is determined that the management information is valid, the period of time required for the starting processing can be reduced. If the management information is invalid, the data area is scanned in step 106 of FIG. 1. That the management information is invalid or is possibly invalid is known before the scanning is started. Therefore, it is possible before the scanning is started to notify a host of the disk device or a user thereof that since the management information is invalid or is possibly invalid, the disk device must, for example, cope with the condition. Therefore, even when the management information is invalid or is possibly invalid, the response characteristic of the disk device can be improved for the host or the user of the disk device.

The procedure to record the authentication information on the disk will be described later by referring to FIG. 2 showing an authentication information recording procedure. The operation to confirm validity of the authentication information will be described later by referring to FIG. 3.

It has been described that the authentication information is obtained in step 103 of FIG. 1. FIG. 2 shows a procedure to record the authentication information on the disk. The procedure of FIG. 2 is conducted during stopping processing of the disk device, for example, when the disk device is turned off or a disk is unloaded therefrom. When the procedure of FIG. 2 is conducted during the stopping processing of the disk device, it is confirmed in step 202 whether or not latest management information including recording progress information matching with a recording state of the data area is already recorded on the disk. If such management information is recorded on the disk, the authentication information is recorded in step 204 on the disk on which the management information is recorded and then the procedure is terminated. If it is confirmed in step 202 that such management information is not recorded on the disk, management information including recording progress information matching with the recording state of the data area is recorded on the disk in step 203. Authentication information is then recorded in step 204 on the disk on which the management information is recorded and the procedure is terminated. By performing the procedure of FIG. 2 during the stopping processing of the disk device, the management information including recording progress information matching with the recording state of the data area is recorded on the disk and the authentication information certifying validity of the management information is recorded on the disk on which the management information is recorded.

It has been described that the validity of the authentication information is confirmed in step 104 of FIG. 1. FIG. 3 shows a procedure to invalidate the validity. The flowchart of FIG. 3 shows a procedure conducted during a recording operation of the disk device to invalidate authentication information. After the starting processing of the disk device, it is confirmed in step 302 whether or not the pertinent recording is a first recording operation. Only if the recording is the first recording operation, information indicating invalidity of authentication information is recorded on the disk in step 303 to resultantly invalidate the authentication information. The procedure shown in FIG. 3 is effective regardless of whether or not the authentication information is recorded on the disk. That is, when the procedure of FIG. 3 is conducted in a state in which the authentication information is recorded on the disk or in a state in which the authentication information is not recorded on the disk, there is established a state indicating invalidity of the authentication information.

Referring now to the embodiments of FIGS. 8 and 9, the processing described in conjunction with the embodiments of FIGS. 1 to 3 will be described using an example in which the processing is applied to a disk device using a DVD-R as a recording medium. It is assumed in this embodiment that the authentication information according to the present invention is a copy of latest recording management data of the management information and the invalidating information according to the present invention is a test pattern recorded in a power calibration area (PCA).

First, the authentication information recording processing of FIG. 2 will be described by referring to FIG. 8. FIG. 8 shows a state of a disk after the processing described below. That is, when the disk is in the state shown in FIG. 6, the disk device executes the stopping processing in response to an indication to unload the disk and then the authentication information recording processing shown in FIG. 2 as an embodiment of the present invention is executed during the stopping processing. In the authentication information recording processing of the disk in the state of FIG. 6, recording progress information obtained from the latest recording management data 602 matches with the actual recording state in the data area and hence the recording management data 602 is regarded as actually latest management information. Authentication information 801 to certify the condition is additionally recorded in the test pattern 501 beforehand recorded in the power calibration area 401. If the data 602 does not match with the recording state of the data area, recording management data 602 reflecting the pertinent recording state of the data area is recorded and then authentication information is recorded. The contents of the authentication information have already been described. That is, the authentication information is a copy of the latest recording management data and is equal in its contents to the recording management data 602 in FIG. 8. It is not necessarily required to record the authentication information in the power calibration area 401. However, the procedure to confirm validity of the authentication information is simplified when the invalidating information to invalidate the authentication information is a test pattern to be recorded in the power calibration area 401 such that the authentication information and the invalidating information are stored in the same area. Therefore, the power calibration area is used as an area to store the authentication information.

Figure 8:
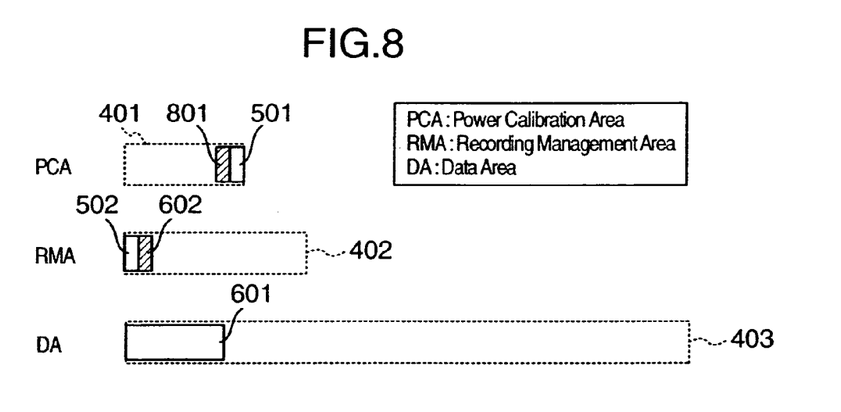
FIG. 8 is a schematic diagram showing an embodiment of the present invention, the diagram illustrating a state of the disk of FIG. 6 in which authentication information provided by the present invention is recorded on the disk and then data and management information are recorded thereon.

Referring now to FIG. 8, description will be given of the management information authentication processing shown in FIG. 1. When a disk in the state of FIG. 8 is loaded in the disk device, the device scans the recording management area 402 to recognize that the recording management data 602 is the latest recording management data. The disk device then executes the management information authentication processing according to the embodiment of the present invention shown in FIG. 1. In the authentication processing, since the management information is present, the disk device acquires authentication information and then confirms validity of the authentication information. To confirm the validity of the authentication information, the disk device scans the power calibration area 401 in a direction from an inner-most side to an outer-most side. The disk device resultantly obtains, as authentication information, information recorded immediately after a boundary at which the recording state changes from the unrecorded state to the recorded state. If the obtained authentication information has a data layout of authentication information, the disk device regards the authentication information valid. If the obtained information has a data layout of the test pattern adopted as the invalidating information, the disk device regards the authentication information invalid.

In the case of FIG. 8, the authentication data 801 existing at the boundary position between the unrecorded area and the recorded area detected through the scanning of the power calibration area 401 is not a test pattern but a copy of the recording management data 602. It is therefore confirmed that the data 801 is valid as authentication data. The disk device compares the authentication data 801 regarded as valid with all or part of the contents of the recording management data 602 of the latest management information. These data items match with each other in FIG. 8, and hence it is proved that the recording progress information in the data area obtained from the recording management data 602 matches with the actual recording state in the data area. Therefore, the data device can determine a start position to additionally store data in the data area without scanning the data area. As a result, the disk device can completely execute the starting processing in a short period of time.

Finally, referring to FIG. 9, description will be given of the authentication information invalidating processing described in conjunction with FIG. 3. FIG. 9 shows a state of the disk in the state of FIG. 8 after the processing below. That is, when the disk is loaded in the disk device, the disk device completely executes the starting processing and then the host indicates a recording operation to the disk device, and the disk device records data on the disk in response to the indication. Having received the recording indication from the host, the disk device conducts a trial writing operation or power calibration in the power calibration area 401 to determine appropriate recording power. A test pattern 901 is additionally recorded in the authentication information 801. The test pattern 901 also serves as invalidating information to invalidate the authentication information 801. In the description of the authentication information invalidating processing associated with FIG. 3, when a recording information is received, invalidating information is recorded if the recording indication is the first recording indication after the starting processing. However, in the first recording after the starting processing, it is required for an ordinary disk device to adjust recording power. Therefore, the test pattern is employed as authentication invalidating data in the example. Data 902 is then recorded on the disk, and the disk is resultantly in the state shown in FIG. 9.

Figure 9:
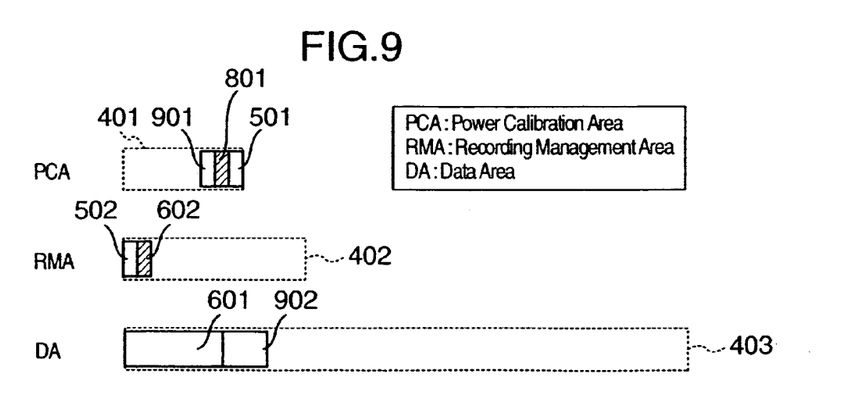
FIG. 9 is a schematic diagram showing an embodiment of the present invention, the diagram illustrating a state of the disk of FIG. 7 in which invalidating information provided by the present invention is recorded on the disk and then data is additionally recorded thereon.

Assume that the disk device executes the starting processing when the disk is in the state of FIG. 9. This may take place, for example, in a case in which the disk device stops its operation because power of the device is unexpectedly turned off with the disk in the state of FIG. 9 and then the disk device is again powered. The disk device scans the reading management area 402 in the starting processing to regard the recording management data 602 as the latest recording management data. Thereafter, the disk device scans the power calibration area 401 to detect a boundary between an unrecorded area and a recorded area and obtains a test pattern 901 adjacent to the boundary. The test pattern 901 thus obtained has a data layout other than the data layout of the recording management data, and hence the authentication information is regarded as invalid. Therefore, it is determined at this point of time that the recording progress information of the data area obtained from the recording management data 602 does not match with the actual recording state of the data area. Therefore, the data area is scanned. The present embodiment is similar to the prior art because the data area scanning is required. However, according to the embodiment of the present invention, it is possible before the data area scanning to determine that the recording management data of the management information is invalid or is possibly invalid. Therefore, at this point of time, it is possible to notify the host or the user that the data area scanning is required and a long period of time is possibly required for the processing. Therefore, the data area can be actually scanned after necessity of the data area scanning is notified to the host or the user. This accordingly improves the response characteristic of the disk device.

Description has been given of embodiments of the present invention. The present invention can be implemented in a disk device of the prior art only by adopting the processing procedure provided by the present invention. The processing procedure in the disk device is ordinarily performed by software which operates on a microcomputer. A disk device ordinarily includes basic functions such as a function to record information on a disk and a function to read information from a disk to visually check the contents thereof and/or to compare the contents with other data. Therefore, the present invention can be implemented only by modifying software of the disk device without any requirement to additionally dispose hardware parts in the disk device.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of authenticating disk management information of a disk using a disk device to certify validity of management information recorded on the disk comprising the steps of:
   recording authentication information on the disk on which the management information is recorded, thereby certifying that the management information is valid;
   recording invalidating information on the disk on which the management information and the authentication information are recorded, thereby invalidating certifying effect of the authentication information, the step of recording invalidating information being performed during startup processing by the disk device;
   recording, during stopping processing of a disk device in which the disk is loaded, authentication information in a power calibration area on the disk if validity of the management information is confirmed, wherein
   the invalidating information uses a power calibration pattern recorded in the power calibration area, and if the last recorded calibration pattern is a test pattern, then the disk management information is deemed to be invalid.

2. A method of authenticating disk management information according to claim 1, comprising the steps of:
   sequentially and additionally recording authentication information and invalidating information in the power calibration area on the disk;
   regarding the management information on the disk as valid if invalidating information is absent after authentication information last recorded on the disk; and
   regarding the management information on the disk as invalid if invalidating information is present after authentication information last recorded on the disk.

3. A method of authenticating disk management information according to claim 1, wherein the authentication information is a copy of the disk management information, and if the information last recorded in the power calibration area is the same as the disk management information, then the disk management information is deemed to be valid.

4. A disk device comprising:
   a disk;
   means for recording authentication information on the disk on which the management information is recorded, thereby certifying that the management information is valid;
   means for recording invalidating information on the disk on which the management information and the authentication information are recorded, thereby invalidating certifying effect of the authentication information, wherein the recording of invalidating information is performed during startup processing by the disk device;
   means for recording, during stopping processing of a disk device in which the disk is loaded, authentication information in a power calibration area on the disk if validity of the management information is confirmed, wherein the invalidating information uses a power calibration pattern recorded in the power calibration area, and if the last recorded calibration pattern is a test pattern, then the disk management information is deemed to be invalid.

5. A disk device according to claim 4, comprising:

means for recording authentication information in a power calibration area on a disk to certify validity of management information in a recording management area on the disk and invalidating information to invalidate certifying effect of the authentication information, in the power calibration area on the disk on which the management information is recorded; and means for determining whether or not the management information on the disk is valid by confirming the authentication information and the invalidating information on the disk.

6. A disk device according to claim 5, wherein:

the authentication information is recorded during the time that stopping processing of the disk device is being performed, if validity of the management information is confirmed; and the invalidating information is recorded, before data recording processing, in response to a data recording request first received after the disk device is started.

* * * * *